(12) United States Patent
Wang

(10) Patent No.: US 12,460,532 B2
(45) Date of Patent: Nov. 4, 2025

(54) CEMENT BONDING EVALUATION WITH A SONIC-LOGGING-WHILE-DRILLING TOOL

(71) Applicant: Halliburton Energy Services, Inc., Houston, TX (US)

(72) Inventor: Ruijia Wang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 388 days.

(21) Appl. No.: 18/302,422

(22) Filed: Apr. 18, 2023

(65) Prior Publication Data
US 2023/0258069 A1 Aug. 17, 2023

Related U.S. Application Data

(63) Continuation of application No. 16/557,255, filed on Aug. 30, 2019, now Pat. No. 11,661,837.
(Continued)

(51) Int. Cl.
*G01V 1/50* (2006.01)
*E21B 47/005* (2012.01)
(Continued)

(52) U.S. Cl.
CPC .......... *E21B 47/005* (2020.05); *E21B 49/003* (2013.01); *G01N 29/046* (2013.01);
(Continued)

(58) Field of Classification Search
CPC ... E21B 47/005; E21B 49/003; G01N 29/046; G01N 29/348; G01N 29/38; G01N 29/42;
(Continued)

(56) References Cited

U.S. PATENT DOCUMENTS

| 4,809,237 A | * | 2/1989 | Vogel | G01V 1/46 367/32 |
| 4,951,266 A | * | 8/1990 | Hsu | G01V 1/48 367/43 |

(Continued)

FOREIGN PATENT DOCUMENTS

| GB | 2530403 B | 9/2017 |
| JP | 2006242955 A | 9/2006 |

(Continued)

OTHER PUBLICATIONS

PCT Application Serial No. PCT/US2019/049137, International Search Report, mailed Dec. 19, 2019, 3 pages.
(Continued)

*Primary Examiner* — Krystine E Breier
(74) *Attorney, Agent, or Firm* — DeLizio, Peacock, Lewin & Guerra LLP

(57) ABSTRACT

Waves from cement bond logging with a sonic logging-while-drilling tool (LWD-CBL) are often contaminated with tool waves and may yield biased CBL amplitudes. The disclosed LWD-CBL wave processing corrects the first echo amplitudes of LWD-CBL before calculating the BI. The LWD-CBL wave processing calculates a tool wave amplitude and a phase angle difference as the difference of the phases between the tool waves and casing waves. The tool waves are then used to correct the LWD-CBL casing wave amplitude and remove errors introduced from tool waves. In conjunction with the sets of operations described, the LWD-CBL wave processing also include array preprocessing operations. Array preprocessing may employ variation of bandpass filtering and frequency-wavenumber (F-K) filtering operations to suppress tool wave.

20 Claims, 15 Drawing Sheets

Related U.S. Application Data

(60) Provisional application No. 62/725,363, filed on Aug. 31, 2018.

(51) Int. Cl.
| | |
|---|---|
| *E21B 49/00* | (2006.01) |
| *G01N 29/04* | (2006.01) |
| *G01N 29/34* | (2006.01) |
| *G01N 29/38* | (2006.01) |
| *G01N 29/42* | (2006.01) |
| *G01N 29/44* | (2006.01) |
| *G01V 1/36* | (2006.01) |
| *G01V 1/02* | (2006.01) |
| *G01V 1/46* | (2006.01) |
| *G01V 1/48* | (2006.01) |

(52) U.S. Cl.
CPC .......... *G01N 29/348* (2013.01); *G01N 29/38* (2013.01); *G01N 29/42* (2013.01); *G01N 29/4463* (2013.01); *G01V 1/362* (2013.01); *G01N 2291/0232* (2013.01); *G01N 2291/044* (2013.01); *G01V 1/02* (2013.01); *G01V 1/46* (2013.01); *G01V 1/48* (2013.01); *G01V 1/50* (2013.01); *G01V 2200/16* (2013.01); *G01V 2210/1299* (2013.01); *G01V 2210/1429* (2013.01); *G01V 2210/242* (2013.01); *G01V 2210/44* (2013.01); *G01V 2210/614* (2013.01)

(58) Field of Classification Search
CPC ....... G01N 29/4463; G01N 2291/0232; G01N 2291/044; G01V 1/362; G01V 1/02; G01V 1/46; G01V 1/48; G01V 1/50; G01V 2200/16; G01V 2210/1299; G01V 2210/1429; G01V 2210/242; G01V 2210/44; G01V 2210/614
See application file for complete search history.

(56) References Cited

U.S. PATENT DOCUMENTS

| 5,859,811 | A | 1/1999 | Miller et al. |
|---|---|---|---|
| 7,414,918 | B2 | 8/2008 | Hurst et al. |
| 7,525,872 | B2 | 4/2009 | Tang et al. |
| 9,863,895 | B1 | 1/2018 | Ma et al. |
| 10,641,917 | B2 * | 5/2020 | Donderici ........... E21B 47/0025 |
| 2009/0213689 | A1 | 8/2009 | Tello |
| 2015/0168581 | A1 | 6/2015 | Izuhara et al. |
| 2016/0061021 | A1 * | 3/2016 | Shaposhnikov ......... G01V 1/50 367/35 |
| 2017/0067337 | A1 * | 3/2017 | Havens .................. G01V 1/288 |
| 2017/0226844 | A1 * | 8/2017 | Izuhara ................. E21B 47/005 |
| 2020/0072036 | A1 | 3/2020 | Wang |

FOREIGN PATENT DOCUMENTS

| WO | 2016040133 | | 3/2016 | |
|---|---|---|---|---|
| WO | WO-2016040133 | A1 * | 3/2016 | ............ G01V 11/00 |
| WO | 2016191025 | A1 | 12/2016 | |
| WO | 2018231234 | | 12/2018 | |
| WO | WO-2018231234 | A1 * | 12/2018 | ............... G01V 1/50 |
| WO | 2020047459 | A1 | 3/2020 | |

OTHER PUBLICATIONS

PCT Application Serial No. PCT/US2019/049137, International Written Opinion, mailed Dec. 19, 2019, 6 pages.
PCT Application Serial No. PCT/US2019/049137; IPRP; Mar. 11, 2021, 7 pages.
"U.S. Appl. No. 16/557,255, Non-Final Office Action", Aug. 16, 2022, 15 pages.
Grosmangin, et al., "A Sonic Method for Analyzing the Quality of Cementation of Borehole Casings", SPE 1512-G, Feb. 1, 1961 00:00:00.0, pp. 165-171.
Kinoshita, et al., "Feasibility and Challenge of Quantitative Cement Evaluation With LWD Sonic", Society of Petroleum Engineers, SPE 166327, Jan. 1, 2013 00:00:00.0, 10 pages.
Pistre, et al., "Attenuation-Based Quantitative Cement Bond Index with LWD Sonic: A Novel Approach Applicable to all Casing and Cement Cases", Society of Petroleum Engineers, SPE-170886-MS, Jan. 1, 2014 00:00:00.0, 18 pages.
Wang, et al., "Understanding Acoustic Methods for Cement Bond Logging", 2016 Acoustical Society of America, 139/5, May 2016, pp. 2407-2416, May 2016, pp. 2407-2416.

* cited by examiner

CEMENT BONDING EVALUATION WITH A SONIC-LOGGING-WHILE-DRILLING TOOL

PRIORITY CLAIM

This application is a continuation of U.S. patent application Ser. No. 16/557,255, filed Aug. 30, 2019, which claims the benefit of priority under 35 U.S.C. § 119(e) to U.S. Provisional Patent Application Ser. No. 62/725,363, filed on Aug. 31, 2018, each of which is herein incorporated by reference in its entirety.

TECHNICAL FIELD

The disclosure generally relates to the field of investigating or analyzing wellbore conditions by determining chemical or physical properties (G01N) and to analyzing cement bonding along the wellbore by the use of ultrasonic, sonic, or infrasonic waves (G01N 29/00).

BACKGROUND

Wellbores for hydrocarbon recovery are typically cased to ensure that the integrity of a wellbore is maintained during subsequent downhole operations. The cementing process involves mixing a slurry of cement, cement additives, and water, then pumping the mix down through the casing to the annulus which is the space formed between the casing and the wall of the wellbore. Cementing adds proper support for the casing and serves as a hydraulic seal. This hydraulic seal is particularly important in achieving zonal isolation and preventing fluid migration from various zones into groundwater resources.

One physical characteristic that is used to represent the integrity of the cement is the bond index (BI). BI is a qualitative measurement of cement adhesion to the exterior casing wall where a BI value of 1.0 represents a perfect cement bond whereas a BI value of 0 represents no adhesion. Traditional cement evaluation techniques that use a wireline logging tool is used to obtain BI.

BRIEF DESCRIPTION OF THE DRAWINGS

Embodiments of the disclosure may be better understood by referencing the accompanying drawings.

DESCRIPTION

Figure 1:
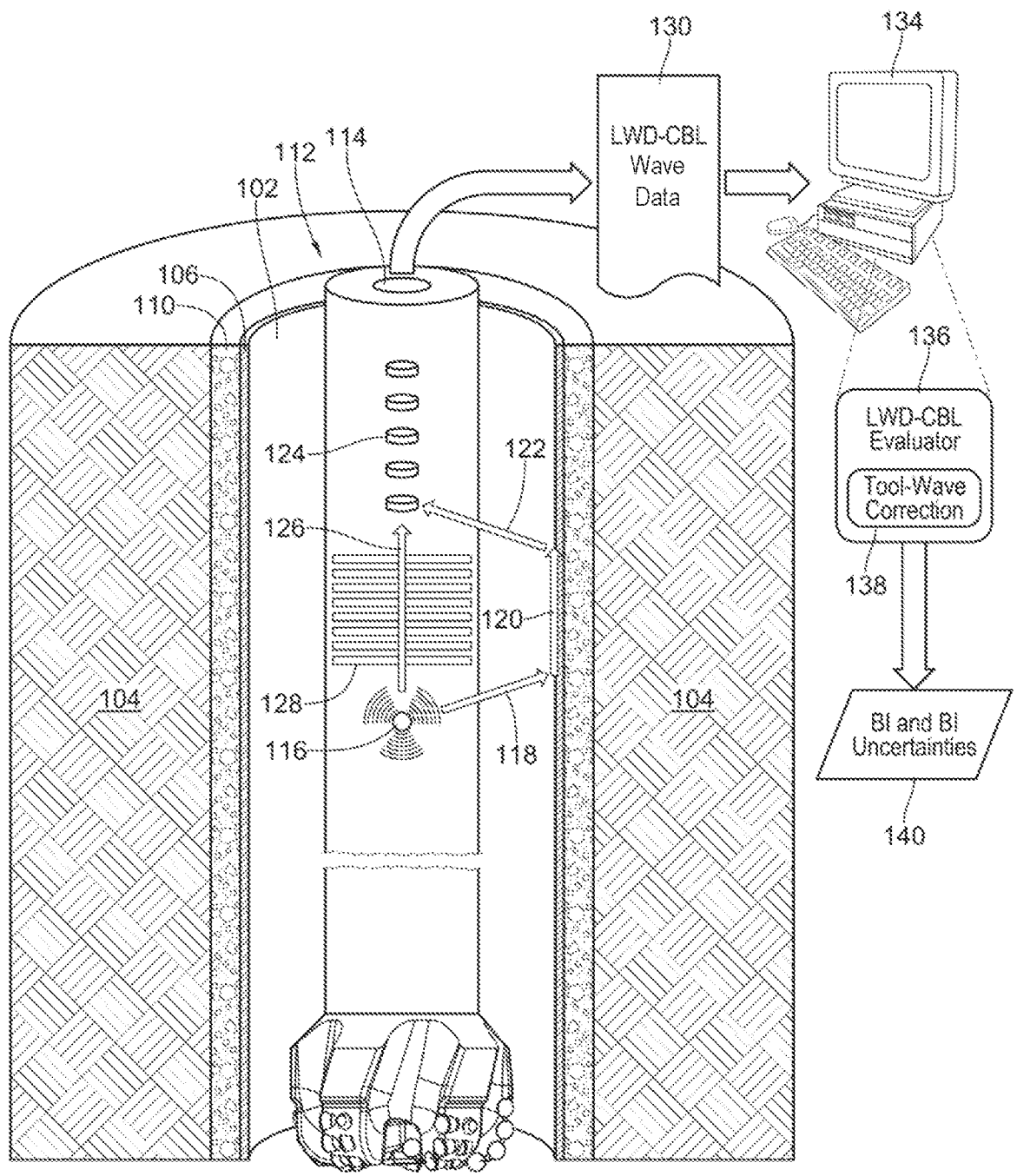
FIG. 1 depicts a partial cross-section view of an example LWD-CBL system for capturing cement bonding acoustic measurements.

The description that follows includes example systems, methods, techniques, and program flows that embody aspects of the disclosure. However, it is understood that this disclosure may be practiced without these specific details. For instance, this disclosure refers to sonic logging in illustrative examples. Various acoustic logging techniques and systems that utilize frequency ranges outside the sonic range, such as ultrasonic range, may be used. Aspects of this disclosure can also be applied to other types of logging to evaluate cement bonding. In other instances, well-known instruction instances, protocols, structures, and techniques have not been shown in detail in order not to obfuscate the description.

Terminology

"Waves" are physical manifestations of a disturbance that transfers energy from point to point in a medium whereas "wave data" is information that may be calculated and processed. For efficiency, "wave data" will simply be referred to as "wave" or "waves" wherever appropriate, such as in operations involving data processing. Similarly, the term "echo" will be used instead of "echo data" wherever it is appropriate to discuss processable information regarding waves that have refracted or reflected.

Overview

Cement Bonding Logging (CBL) is a procedure in the assessment of a well that ensures integrity, reduces wellbore collapse risks, and verifies zonal isolation. Although various types of logging may be performed for cement bonding analysis, sonic logging performed in a wireline operation is typically used. Sonic logging generates acoustic waves that travel from a transmitter to the wellbore and that return back to one or more receivers to obtain information in the form of acoustic wave data.

Various properties of the returning waves, such as interval transit time, amplitude, and phase, may be assessed to obtain information about the wellbore, including the BI. Using a traditional wireline CBL ("WL-CBL") however, is costly and time-consuming as it involves separate wireline runs apart from the drilling of the wellbore. Moreover, for high angle (HA) wells, horizontal (HZ) wells, and zones with heavy camber, WL-CBL may require the wireline tool to be conveyed with a tractor or on a drill pipe and incur additional time and resources.

Using logging-while-drilling CBL ("LWD-CBL") may be an alternative to WL-CBL that saves costs and rig time by eliminating the need for separate wireline runs. In LWD-CBL, the sonic tools are attached as part of the drill string and operated while trapping in or out of the borehole. Although it is possible to use a standard wave processing technique, such as that used in WL-CBL, to process LWD-CBL data, traditional wave processing techniques assume an environment relatively free of tool waves. Strong tool waves present in LWD tools that are not typically present in wireline tools may yield biased CBL amplitudes. Strong tool waves are present in LWD tools because of the limitations in acoustic isolators available for an LWD environment. In contrast to a wireline environment, the tool mandrel cannot be fully cut in the LWD environment to isolate the receivers from the sonic waves generated by the monopole transmitter due to drill-collar strength requirement. Thus, the isolators in LWD tools do not have the same performance in reducing tool waves as the isolators in WL tools. This biased CBL amplitudes may, in turn, generate significant errors in estimating the BI and adversely affect the final decision in the assessment of the bonding condition downhole.

An LWD-CBL wave processing technique that reduces and corrects errors stemming from tool waves provides a more accurate determination of the BI of a well and would allow the less resource intensive LWD-CBL to be relied upon with greater certainty. This LWD-CBL wave processing technique incorporates various operations to handle errors introduced from the tool wave. The disclosed LWD-CBL wave processing corrects the first echo amplitudes of LWD-CBL before calculating the BI. The LWD-CBL wave processing calculates a phase angle difference as the difference of the phases between the tool waves and casing waves. The phase angle difference is then used to correct the LWD-CBL casing wave amplitude and remove errors introduced from tool waves. The LWD-CBL wave processing also removes the tool waves from the LWD-CBL amplitude. To remove the tool waves, the LWD-CBL wave processing first isolates the tool waves and then uses the isolated tool waves to remove tool wave interference from the raw waves. In conjunction with the sets of operations described, the LWD-CBL wave processing may also include array preprocessing operations. Array preprocessing may employ variation of bandpass filtering and frequency-wavenumber (F-K) filtering operations to suppress tool wave.

Example Logging while Drilling (LWD) Application

FIG. 1 depicts a partial cross-section view of an example LWD-CBL system for capturing cement bonding acoustic measurements. The illustrated LWD-CBL system includes a borehole 102 extending through various earth strata in a subterranean formation 104. An annular casing 106 extends from the surface into subterranean formation 104. Casing 106 provides a path through which formation fluids travel from downhole positions to the surface. During cementing however, the borehole 102 may be empty or filled with a fluid medium, such as drilling mud or uncured cement. The casing 106 is attached to the walls of the wellbore via cement 110 pumped down from the surface. In some regions of the borehole 102, the cement 110 may not be fully adhered to the casing 106. In other regions, the casing 106 may be completely free of cement depending on the location and time that the cement has had to travel up the annulus between the casing 106 and the borehole 102.

The interaction between acoustic waves and the cement 110 around the casing 106 is used to determine the cement BI. The LWD-CBL system includes at least one logging tool that may be configured as a CBL tool 112. CBL tool 112 is coupled to a conveyance component 114 comprised of a drilling string and bottom hole assembly deployed into wellbore 102. The CBL tool 112 may be coupled to the drilling string or imbedded as a component of the drilling string.

The CBL tool 112 includes one or more transmitters 116 that are configured to transmit acoustic signals (depicted with line 118) within the wellbore 102. The transmitter typically generates at higher frequencies signals—between 20 and 30 kHz. The transmitted signals 118 travel along the casing 106 as casing waves (depicted with line 120) and consequently induce corresponding acoustic echo responses (depicted with line 122). The presence of cement behind the casing is detected as a rapid decay of casing resonance whereas a lack of cement is detected as a long resonant decay. Acoustic receivers 124 in the CBL tool 112 obtain the acoustic echo responses 122 that carry the cement bonding information. Generally, receivers are centered in a CBL tool. The use of eccentric receivers results in reduced signal amplitude and travel time that introduces errors, particular as errors in eccentric receivers are accentuated in higher operating frequencies such as the sonic range used in CBL.

Furthermore, drill string includes a Kelly, drill pipe, and a bottom hole assembly located at the lower portion of the drill pipe. The bottom hole assembly operates the drill bit 123 through a drill bit motor or by rotating the entire string to drill into the subterranean formation 104. In some embodiments, drilling mud is forced through the interior of the drill string, and through the interior of the bottom hole assembly. The drilling mud exits from the nozzles in the drill bit 123 and cools and lubricates the bit 123 and removes cuttings and carries the cuttings to the surface along the annulus of the wellbore. The drilling mud may also serve as a communication medium of the telemetry to the surface. By altering the flow of the drilling mud through the interior of the drill string, pressure pulses may be generated in the form of acoustic signals, in the column of drilling fluid. Moreover, by selectively varying the pressure pulses, signals can be generated to carry information indicative of downhole parameters to the surface for immediate analysis.

Tool waves (depicted with line 126) act as noise that interferes with the acoustic echo response 122. Tool waves 126 are acoustic signals generated by one or more transmitters 116 that travel through the LWD-CBL tool. Tool waves 126 are generated as the one or more transmitters 116 transmit acoustic signals 118 within the wellbore 102. The CBL tool 112 may include a steel sonde or other kinds of acoustic isolators 128 to isolate the receivers 124 from being affected by the tool waves 126. Acoustic isolators 128 may be comprised of various machined slots or grooves laid out in tortuous paths in order to attenuate the tool waves 126. However, the acoustic isolators may not be available in the CBL tool and are often inadequate to attenuate tool waves due to design limitations placed on acoustic isolators in an LWD environment. In order for cement BI to be determined from the echo responses 122, the waves obtained by the receivers 124 are processed to correct for the interference of tool waves in LWD conditions. The LWD-CBL tool 112 generates an LWD-CBL wave data 130 which are processed and corrected for tool waves to determine the BI with greater accuracy. The wave data 130 contains an array of wave from the multiple receivers 124 with each wave comprising waves of various kinds, such as tool waves, casing waves, and noise. A computer 132 is programmed with a program 134 ("LWD-CBL evaluator") to process the LWD-CBL wave to determine the BI and BI Uncertainties of the borehole. The LWD-CBL evaluator 134 includes program code 138 ("tool wave correction") to calculate the tool wave amplitude and the difference of the phases between the tool waves and casing waves and remove the tool waves from the LWD-CBL wave data. The LWD-CBL evaluator 136 then generates data 140 that includes bonding index of the cement behind casing and its uncertainty.

Example LWD-CBL Processing

Figure 2:
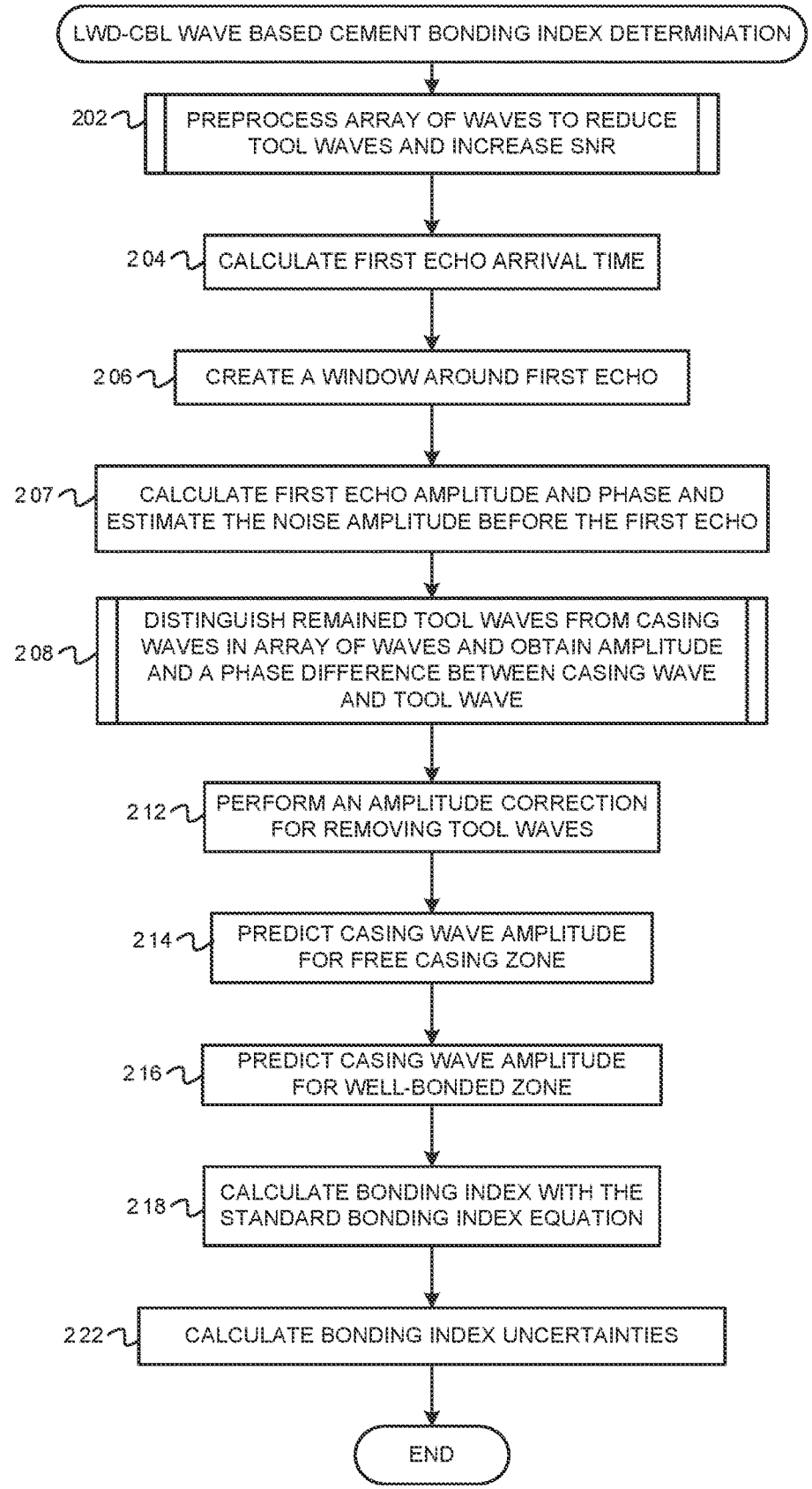
FIG. 2 depicts a flowchart of example operations for performing LWD-CBL wave processing.

FIG. 2 depicts a flowchart of example operations for performing LWD-CBL wave processing. The example operations can be performed by hardware, software, firmware, or a combination thereof. For example, at least some of the operations can be performed by a processor executing program code or instructions. In some embodiments, such operations can be performed in a computer at the surface. The description refers to a "CBL evaluator" as performing the example operations. The moniker "CBL evaluator" is used for convenience as the operations are performed by a program or programs executed/interpreted by a device.

At block 202, the CBL evaluator preprocesses array of waves obtained by LWD-CBL to reduce the tool waves and other noise. Each wave of the array of waves are correlated to each of the receivers of the LWD-CBL tool. The CBL evaluator preprocesses the array of waves by applying one or more of a bandpass time-domain filter and a frequency-wavenumber (F-K) filter on the array of waves. Both bandpass time-domain filter and F-K filter comprise of series of operations that propagate and shift each of the waves in the application of their respective filters. As the result of the preprocessing, signals from tool waves in the array of waves are attenuated. The preprocessing further attenuates background noise and improves the SNR.

At block 204, the CBL evaluator calculates a first echo arrival time. First echo arrival time is calculated by measuring the time at which the first echo of the wave was received by the receiver. A first echo is the first of such signals measured from the receiver. Although the acoustic signal in a cased hole environment with an LWD tool includes various orders of tool waves, casing waves, formation waves, cement waves, and borehole waves, the first echo generally comprises of only a casing wave and a tool wave. The CBL evaluator obtains the casing wave arrival time by calculating the time in which the LWD-CBL tool transmitter generates an acoustic signal and the time in which the receivers received the first echo, adjusting for differences in distance between the transmitter and each of the receivers.

At block 206, the CBL evaluator creates a time-window around the first echo. To create the time-window, the CBL evaluator isolates a region around the first echo using a window function. A window function is a function that has zero-values outside of a chosen interval such that when a wave is multiplied by the window function the edges are tapered to isolate a signal in the wave. The window function is applied to the section of the wave associated with the arrival time of the first echo. The isolated first echo comprises of casing waves and tool waves.

At block 207, the CBL evaluator calculates a first echo amplitude and estimates a noise amplitude before the first echo based on the created time window. The CBL evaluator measures the amplitude and the phase angle of the first echo inside the window. The CBL evaluator then approximates the noise amplitude by measuring the noise isolated inside the region before the time-window.

At block 208, the CBL evaluator distinguishes remained tool waves after preprocessing from casing waves within the array of waves and obtains an amplitude and phase difference between casing waves and tool waves. Example operations for obtaining the amplitude and phase difference between a casing wave and a tool wave are depicted in FIG. 3.

Figure 3:
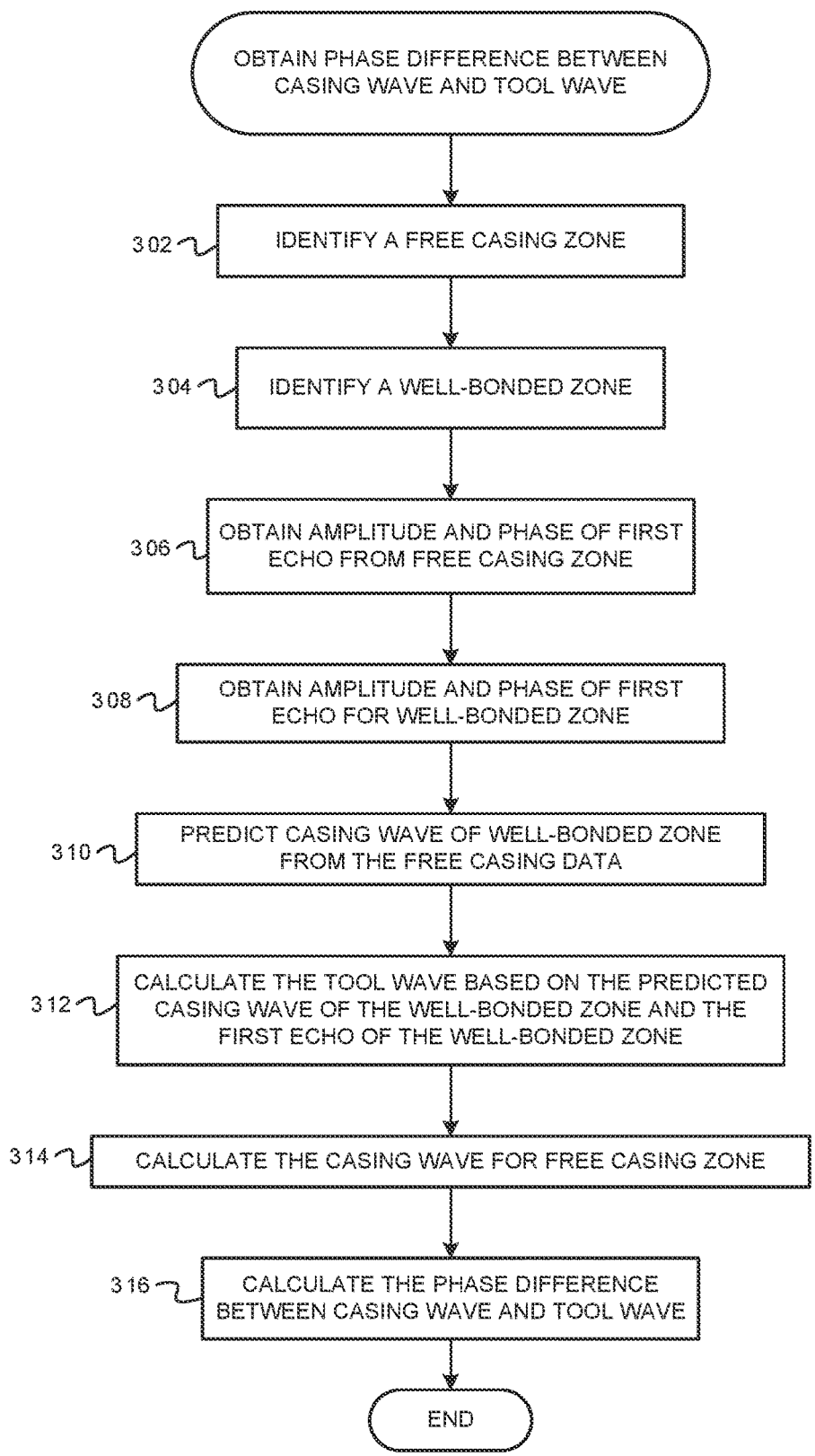
FIG. 3 depicts a flowchart of example operations for identifying remained tool waves after preprocessing and obtaining the amplitude and phase difference between the casing arrival signal and the tool arrival signal in the array of waves from the CBL tool.

FIG. 3 is a flowchart of example operations for identifying remained tool waves after preprocessing and obtaining the amplitude and phase difference between the casing arrival signal and the tool arrival signal in the array of waves from the CBL tool. At block 302, the CBL evaluator identifies a free casing zone from the wave obtained by the LWD-CBL tool. Free casing zones are zones in the wave that represent sections in the wellbore having a casing that is completely or nearly completely unbonded with cement. The CBL evaluator identifies free casing zones by using information obtained during well planning such as pipe setting-depth selection, casing design, and a cement plan and by using a variable density log (VDL) display generated from the wave obtained in the LWD-CBL operation. Free casing zones are identified by straight line and high amplitude patterns on the VDL display of acoustic wave.

At block 304, the CBL evaluator identifies a well-bonded zone from the wave obtained by the LWD-CBL tool. A well-bonded zone is a zone where the casing and the surrounding cement form a complete or near-complete adhesion. Similar to block 302, the CBL evaluator identifies well-bonded zones by using information obtained during well planning and by using a variable density log (VDL) display generated from the wave obtained in the LWD-CBL operation. Well-Bonded zones are identified by low amplitude patterns on the VDL display of acoustic wave.

At block 306, the CBL evaluator obtains the amplitude and phase of the first echo from the free casing zone. Using the identified free casing zone, the CBL evaluator locates the first echo within the wave associated with the free casing zone, $S_{echo1}^{free-casing}$. The CBL evaluator then isolates the region around the first echo of the free casing zone within the time-window. The CBL evaluator then measures the amplitude and the phase angle of the isolated first echo.

At block 308, the CBL evaluator obtains the amplitude and phase of the first echo from the well-bonded zone. The CBL evaluator locates the first echo within the wave associated with the well-bonded zone, $S_{echo1}^{well-bonded}$. The CBL evaluator then isolates the region around the first echo of the well-bonded zone using a window function. The CBL evaluator then obtains the amplitude and phase of the first echo of the well-bonded zone.

At block 310, the CBL evaluator predicts the casing wave of the well-bonded zone from the free casing data. First, the CBL evaluator uses forward modeling to predict the trend of casing wave amplitude and phase versus the bonding index. By using fundamental casing, cement, and mud properties (e.g., cement density, P-wave slowness, and casing thickness) the CBL evaluator generates a model of acoustic responses. The CBL evaluator generates a numerical model by solving wave equations which govern propagation of acoustic waves in a medium with certain boundary conditions. The parameters of the forward model comprise of physical properties that governs acoustic wave propagation, such as thickness of casing and cement, BI in terms of the ratio of the range of bonded cement to all cement in the azimuthal direction, and acoustic impedances of the borehole fluid, casing, cement, and formation. The CBL evaluator then uses the forward modeling results to determine the casing wave from the free casing zone, $S_{casing}^{free-casing}$. In another embodiment, the CBL evaluator determines the casing wave from the free casing zone to be equal to the first echo from the free casing zone. In free casing zones, casing waves are often much larger than the tool waves, and consequently, the wave of free casing can be calculated based on Equation 3.

$$S_{casing}^{free-casing} = S_{echo1}^{free-casing} \quad (3)$$

Forward modeling also generates a factor that describes the amplitude change and phase change of the casing arrivals from the free casing to well-bonded zone. In some embodiments, the factor can be generated from an empirical equation associated with the casing and mud properties. The factor with a complex number of C is denoted by $C_{FLto100BD}^{model}$. Then, the well-bonded casing wave can be predicted using Equation 4.

$$S_{casing}^{well-bonded} = S_{casing}^{free-casing} C_{FLtoWell-bonded}^{model} \quad (4)$$

At block 312, the CBL evaluator calculates the tool wave by using the results from the forward modeling.

Because the minimal phase change of casing arrivals may be ignored, the CBL evaluator calculates the tool wave, $S_{TL}$, using Equation 5.

$$S_{TL} = S_{echo1}^{well-bonded} - S_{casing}^{well-bonded} \quad (5)$$

The CBL evaluator takes the difference between the first echo from well-bonded zone and the predicted casing wave from the free casing zone. The amplitude and phase of the remained tool wave after preprocessing are obtained from the difference in the waves.

At block 314, the CBL evaluator updates the casing wave for free casing zone. The casing wave for free casing is determined using Equation 6, that describes the relationship of tool waves, casing waves, and the first echo in a free casing zone.

$$S_{casing}^{free-casing} = S_{echo1}^{free-casing} - S_{TL} \quad (6)$$

At block 316, the CBL evaluator calculates the phase difference between the casing wave and the tool wave. The phase difference between casing first arrival and tool first arrival can be calculated using Equation 7.

$$\phi_{difference} = \text{Angle}(S_{casing}^{free-casing}) - \text{Angle}(S_{TL}) \quad (7)$$

In some embodiments, outputs in FIG. 3 can be premeasured with a known situation, such as, an anechoic water tank, as it is known that tool wave amplitude and phase in the first echo do not change much with differing BI.

Returning to FIG. 2, at block 212, the CBL evaluator performs an amplitude correction for removing tool waves from the first echo. Because the first echo is essentially a combination of casing waves and tool waves, a simplified two-wave-interference model can describe the amplitude of the first echo from the wave obtained through LWD-CBL. The CBL evaluator approximates the amplitude of the first echo by using Equation 8 which describes the two-component nature of the first echo.

$$S(z) = A_C(z)\exp[-iP_C(z)] + A_T \exp(-iP_T) \quad (8)$$

$A_C$ and $P_C$ of Equation 8 represent the amplitude and the phase of the casing waves at certain depth z, while $A_T$ and $P_T$ denote the amplitude and the phase of the tool waves. S(z) is the measured first echo signal at the depth z. By substituting in the tool wave amplitude and phase with values obtained from the procedure 208, the casing wave amplitude $A_C$ for casing of certain depth, z, can be determined. The casing at depth z, may be the well-bonded zone or free casing zone identified above, but may also encompass other regions of the casing with partially bonded cement. The CBL evaluator solves for $A_C$ using the first echo amplitude and phase obtained at block 207 to substitute for S(z) and data obtained at blocks 208 to substitute for $A_T$, $P_C$, and $P_T$.

At block 214, the CBL evaluator uses forward modeling to predict a casing wave amplitude for a free casing zone. The CBL evaluator generates a numerical model by solving wave equations which govern propagation of acoustic waves in a medium with certain boundary conditions similar to the operation performed at block 310.

At block 216, the CBL evaluator uses forward modeling to predict a casing wave amplitude for the well-bonded zones. The CBL evaluator generates a numerical model by solving wave equations which govern propagation of acoustic waves in a medium with certain boundary conditions to predict the casing wave amplitude for the well-bonded zones.

At block 218, the CBL evaluator calculates the BI using the BI equation. Using the results from blocks 212, 214, and 216, the CBL evaluator calculates the BI at a certain depth using the standard BI equation described in Equation 9.

$$BI(z) = \frac{\log_{10}A(z) - \log_{10}A(FP)}{\log_{10}A(WB) - \log_{10}A(FP)} \quad (9)$$

In Equation 9, A(z) is the amplitude of the first echo recorded at depth z, A(FP) is the amplitude of the corresponding echo estimated in a section of casing judged to be uncemented or "free-pipe" (FP), and A(WB) is the corresponding amplitude in a section of casing judged to be fully cemented or "well-bonded" (WB). The CBL evaluator solves for the BI with A(z) obtained at block 212, A(FP) obtained at block 214, and A(WB) obtained at block 216.

At block 222, the CBL evaluator calculates the BI uncertainties. The CBL evaluator obtains the approximate noise amplitude that precedes the first echo to calculate the BI uncertainty. The CBL evaluator adds or subtracts the estimated noise amplitude from the corrected first echo amplitude obtained at block 212. This operation is described by Equations 10-11 below, where $A(z)_{min}$ denote the minimum amplitude value of the first echo, and $A(z)_{max}$ represent the maximum amplitude value of the first echo.

$$A(z)_{min} = A(z) - A(z)_{noise}, \quad (10)$$

$$A(z)_{max} = A(z) + A(z)_{noise}, \quad (11)$$

In some embodiments, the uncertainty of tool wave is also added into Equations 10-11 to account for tool wave uncertainty as described by Equations 12-13.

$$A(z)_{min} = A(z) - A(z)_{noise} - A_{tool}^{error} \quad (12)$$

$$A(z)_{max} = A(z) + A(z)_{noise} + A_{tool}^{error} \quad (13)$$

The CBL evaluator determines the BI confidence interval by substituting the equations representing upper and lower echo amplitudes boundaries into the BI equation described by Equation 9.

Figure 4:
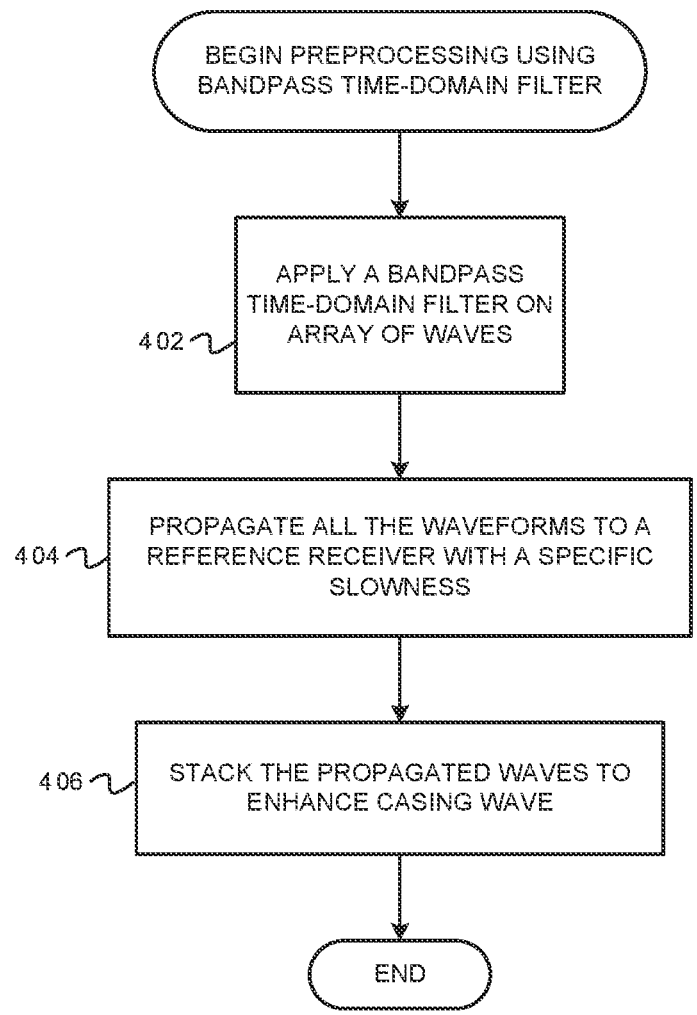
FIG. 4 depicts a flowchart of operations of preprocessing the array of waves to reduce the tool waves and other noises using a bandpass time-domain filter.

Revisiting the preprocessing operation of block 202, the CBL evaluator may preprocess the array of waves according to different embodiments. FIG. 3 and FIG. 4 are flowcharts of example operations for different embodiments to preprocess array of waves to reduce tool waves and increase SNR. FIG. 4 is a flowchart of example operations for preprocessing the array of waves using a bandpass time-domain filter to reduce the tool waves and other noise.

At block 402, the CBL evaluator applies a bandpass time-domain filter on the array of waves. The bandpass time-domain filter allows frequencies within a certain range and attenuates frequencies outside that range. The bandpass filter uses the data in the intrinsic stopband of the tool waves that exists between the first and second modes associated with the tool mandrel. The CBL evaluator first determines the location of the tool wave stopband to identify target frequencies to keep. Once the tool wave stopband is identified, the CBL evaluator removes signals outside of the frequencies in the tool wave stopband. Attenuation of the frequencies outside of the stopband of the tool wave significantly suppresses the tool waves. The CBL evaluator primarily removes low-frequency regions of the waves in this operation as low-frequency tool waves are often strong and may bias the measured first echo amplitude; this may result in ringing signals before a first echo where the first echo is the first transmitted signal refracted from the casing back to the LWD-CBL tool receiver. In the case that ringing signals are present, the CBL evaluator first determines the arrival time of original first echo before applying the bandpass filter.

At block 404, the CBL evaluator propagates all of the array of waves to a reference receiver with a specific slowness. The reference receiver is a receiver selected from the plurality of receivers of the LWD-CBL tool that will be used to offset the waves of the other receivers. The CBL evaluator propagates the non-reference waves by applying the wave propagation equation, Equation 14.

$$Wav_i^j(t)=Wav_i|t+s(z_i-z_j)| \tag{14}$$

In Equation 14, $Wav_i$ is the wave spectrum at the current receiver, $z_i$ and $z_j$ denote the offset of the reference receiver and the current receiver, and s is the reference slowness for propagating the waves to the other receiver. The CBL evaluator may select the reference slowness to equal the casing wave speed to increase the SNR of random noise. Because the tool wave slowness has a slightly different propagating slowness from the casing slowness speed, the tool waves are also suppressed.

Alternatively, at block 404, to enhance the casing wave, the CBL evaluator calculates a casing slowness, sc, from Equation 15.

$$s_c = \max \left| \frac{\sum_{i=1}^m \exp\, i(k_{casing}z_i - i\omega s(z_i - z_j))}{\sum_{i=1}^m \exp\, i(k_{tool}z_i - i\omega s(z_i - z_j))} \right| \tag{15}$$

In Equation 15, $k_{casing}$ represents the wavenumber of casing waves at the peak frequency and $k_{tool}$ represent the wavenumber of tool waves at the peak frequency. At block 406, the CBL evaluator stacks the propagated waves to enhance casing wave. The CBL evaluator stacks the waves that were propagated at block 304 by summing all the waves together. Summing signals of the waves that are of the same phase are amplified whereas signals of different phase are attenuated. By stacking the propagated waves using the same casing slowness, the CBL evaluator enhances the casing waves because casing waves with the same casing slowness are in the same phase. Other signals, such as noise signals, often do not have the same phase and are thus suppressed. In some embodiments, the CBL evaluator selects the casing slowness value that maximizes the ratio between the casing wave amplitude and the road noise. In other embodiments, the CBL evaluator selects a slowness that is different from the casing wave slowness to suppress the tool waves as described in equation 15. The final stacked waves proceed on to rest of the operations described in FIG. 2.

Figure 5:
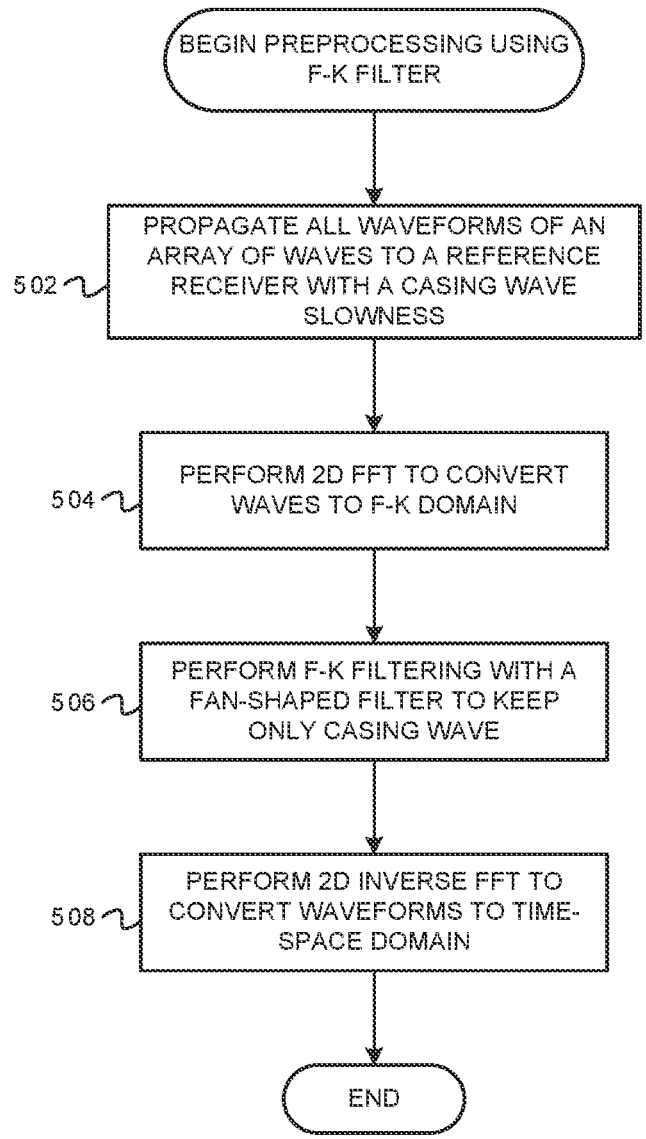
FIG. 5 depicts a flowchart of operations of preprocessing the array of waves to reduce the tool waves and other noises using an F-K filter.

Alternatively, the CBL evaluator may preprocess the array of waves according to FIG. 5. FIG. 5 is a flowchart of example operations for preprocessing the array of waves using an F-K filter to reduce the tool waves and other noises.

At block 502 the CBL evaluator propagates all waves of an array of waves to a reference receiver using a casing wave slowness. The CBL evaluator performs operation analogous to block 404 with the reference slowness to equal the casing wave slowness. In some embodiments, the CBL evaluator may skip block 502.

At block 504, the CBL evaluator performs a 2D FAST Fourier Transform (FFT) to convert the array of waves into F-K domain. F-K domain is a domain in which the independent variables comprises of frequency (f) and wavenumber (k). In performing the 2D FFT, the CBL evaluator effectively contours the energy density, represented by the wave, within a given time interval on a frequency-versus-wavenumber basis.

Figure 6B:
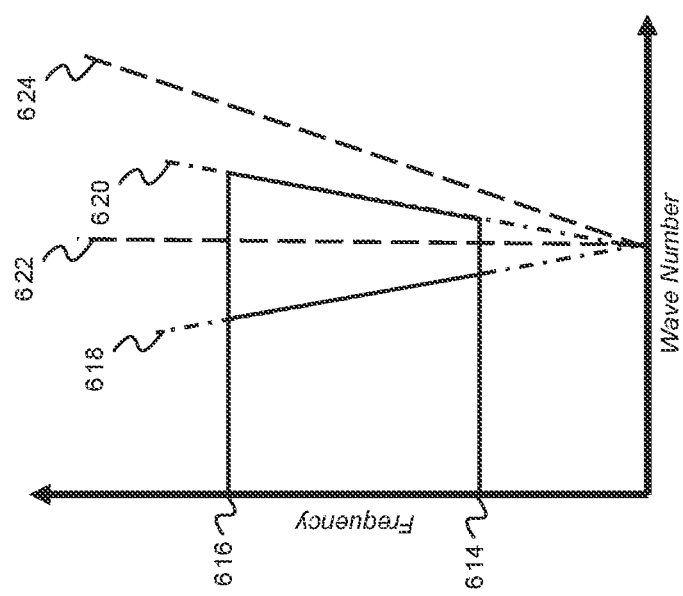
FIG. 6B depicts a graph of a fan-shaped filter if all of the waves are propagated to a reference receiver with the casing wave slowness.
Figure 6A:
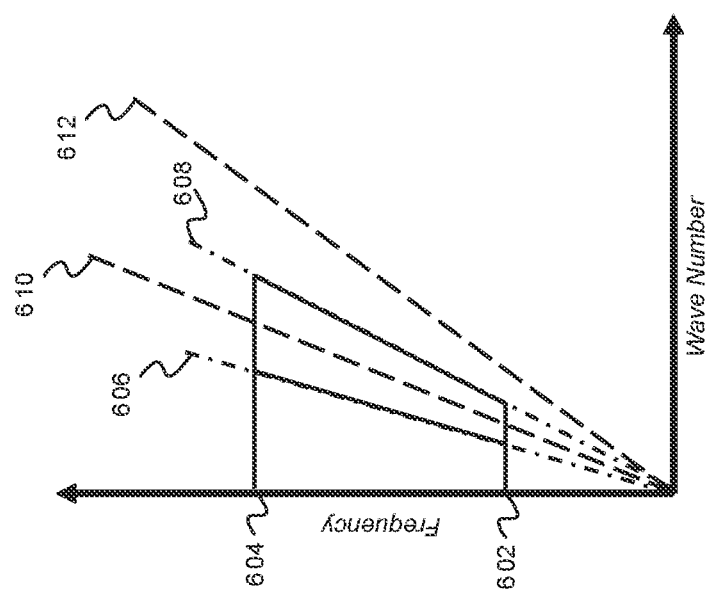
FIG. 6A depicts a graph of a fan-shaped filter if none of the waves are propagated to a reference receiver with the casing wave slowness.

At block 506 the CBL evaluator performs an F-K filtering with a fan-shaped filter. The CBL evaluator selects a range of slowness, $s_{min}$ and $s_{max}$, by maximizing the amplitude ratio between the casing waves and tool waves in each of the array of waves. CBL evaluator uses forward modeling similar to that described at block 214 to determine $s_{min}$ and $s_{max}$. Once $s_{min}$ and $s_{max}$ have been determined, the CBL evaluator excludes all signals outside of the boundary lines formed by $s_{min}$ and $s_{max}$ on the F-K domain wave data. To illustrate, FIGS. 6A and 6B depict two graphs having fan-shaped filters. FIG. 6A depicts a graph of a fan-shaped filter if none of the waves are propagated to a reference receiver with the casing wave slowness. The FIG. 6B depicts a graph of a fan-shaped filter if all of the waves are propagated to a reference receiver with the casing wave slowness, as described at block 502.

The graph of FIG. 6A illustrates the fan-shaped filter determined by the intrinsic stop band of the tool waves, $f_{min}$ 602 and $f_{max}$ 604. All signals outside this range are excluded. The graph also includes a slowness window of $s_{min}$ 606 and $s_{max}$ 608, which covers the casing wave slowness 610 and excludes the tool wave slowness 612.

The graph of FIG. 6B illustrates a similar fan-shaped filter as FIG. 6B but with all of the waves propagated to a reference receiver with the casing wave slowness. A fan-shaped filter is similarly formed by the intrinsic stop band of the tool waves, $f_{min}$ 614 and $f_{max}$ 616. All signals outside this range are excluded. The graph also includes a slowness window of $s_{min}$ 618 and $s_{max}$ 620, which covers the casing wave slowness 622 and excludes the tool wave slowness 624. The graph of FIG. 6B may be useful in avoiding aliasing issues. Because of inherent limitations in the size of the wave arrays, the wave number axis may cover only a range of ½dz. Thus, at higher frequencies the casing waves in FIG. 6A may go to the negative axis of the wave number domain whereas the casing waves in FIG. 6B will not. Because the waves have been aligned according to the casing wave slowness in FIG. 6B, the casing waves will stay with the wave number of zero.

Returning back to FIG. 5, at block 508 the CBL evaluator performs a 2D inverse FFT to convert the filtered waves back to the time-space domain. The final waves are displayed in the time-space domain and the CBL evaluator proceeds on to rest of the operations described in FIG. 2. In an alternate embodiment, CBL evaluator preprocesses array of waves at block 202 by using an F-K filter in conjunction with the bandpass time-domain filter.

Figure 7:
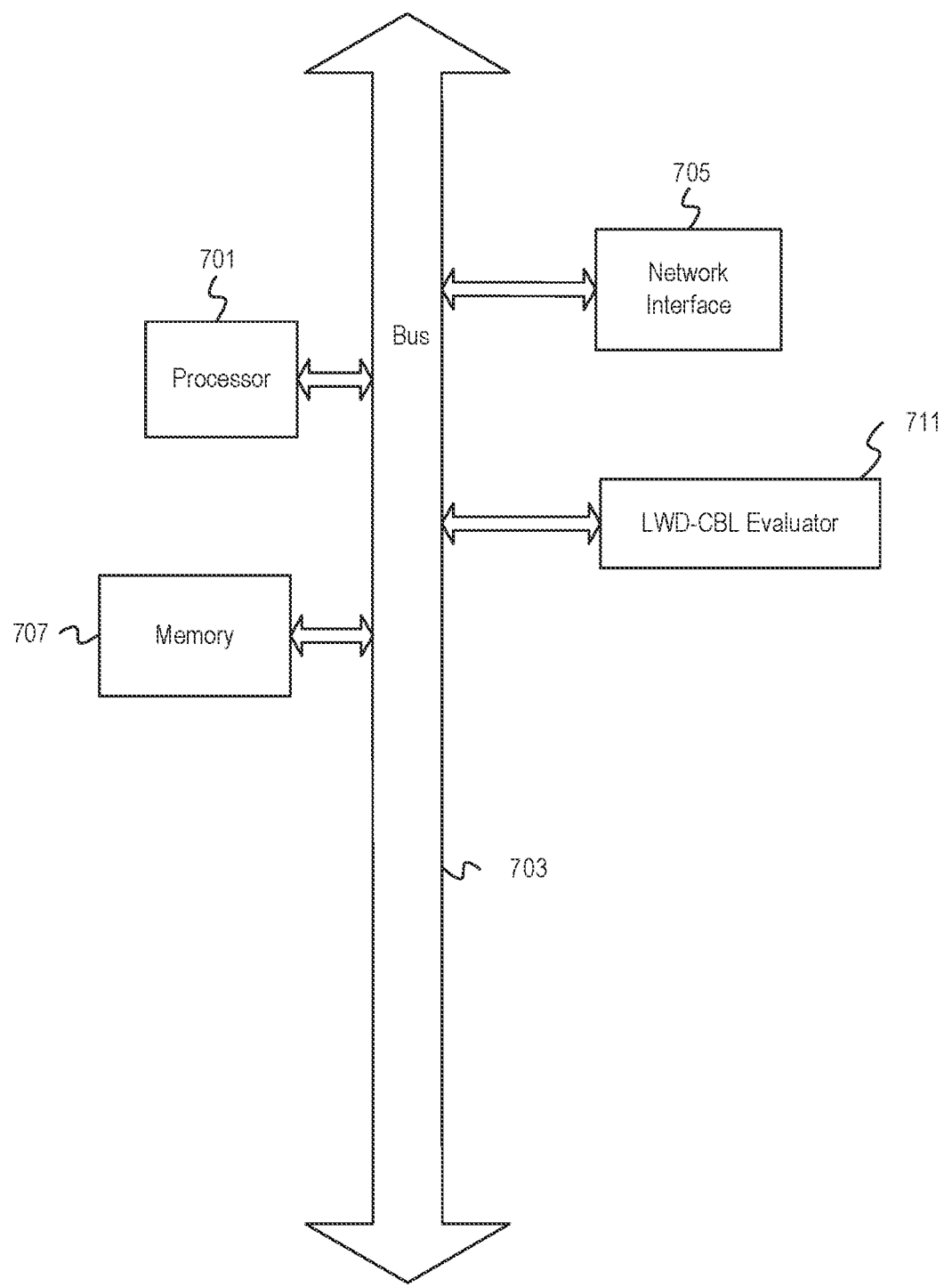
FIG. 7 depicts an example computer that includes an LWD-CBL evaluator.

FIG. 7 depicts an example computer with an LWD-CBL evaluator. The computer includes a processor 701 (possibly including multiple processors, multiple cores, multiple nodes, and/or implementing multi-threading, etc.). The computer includes memory 707. The memory 707 may be system memory or any one or more realizations of machine-readable media. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a RAM, a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium. Any combination of one or more machine readable medium(s) may be utilized.

The computer system also includes a bus 703 and a network interface 705. The computer also includes an LWD-CBL evaluator 711 and a controller 715. The LWD-CBL evaluator 711 can perform various processing of acoustic waves (as described above). The processing of acoustic waves at least involves processing of LWD-CBL data to determine the BI.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus for execution to implement the various methods described above.

Figure 8:
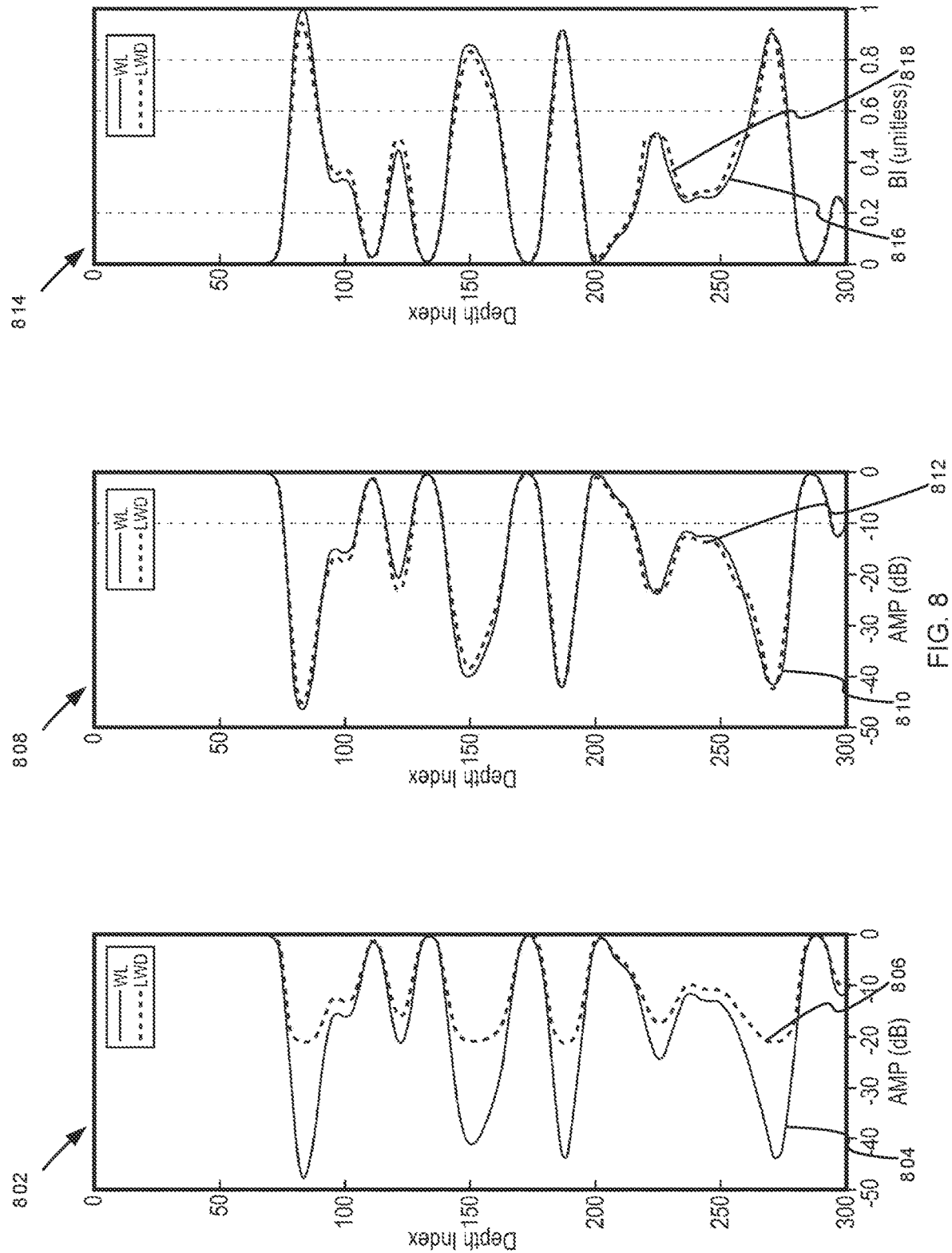
FIG. 8 depicts graphs generated from a simulated CBL data showing the improvements in BI prediction made by the LWD-CBL evaluator.

To help illustrate the effects of LWD-CBL wave processing described in FIGS. 2, 3, and 4, FIGS. 8-15 are described below. FIG. 8 depicts graphs generated from a synthetic CBL data showing the improvements in BI prediction made by the LWD-CBL evaluator. A first graph 802 depicts a synthetic WL-CBL first echo amplitude 804 and a synthetic LWD-CBL first echo amplitude 806, where a conventional approach without preprocessing is utilized. LWD-CBL first echo amplitude 806 is analogous to WL-CBL first echo amplitude 804 but has been corrupted with tool waves. A second graph 808 depicts a WL-CBL amplitude 810 identical to WL-CBL first echo amplitude 804 of first graph 802. Additionally, the second graph 808 depicts a corrected LWD-CBL first echo amplitude 812 obtained from the synthetic LWD-CBL first echo amplitude 806 by using LWD-CBL processing described in FIG. 2 to remove tool waves. A third graph 814 depicts a WL-CBL BI data 816 calculated from the WL-CBL first echo amplitude 810 and an LWD-CBL BI data 818 calculated from the corrected LWD-CBL first echo amplitude 812. The third graph 814 shows excellent agreement between the two BI's.

Figure 9:
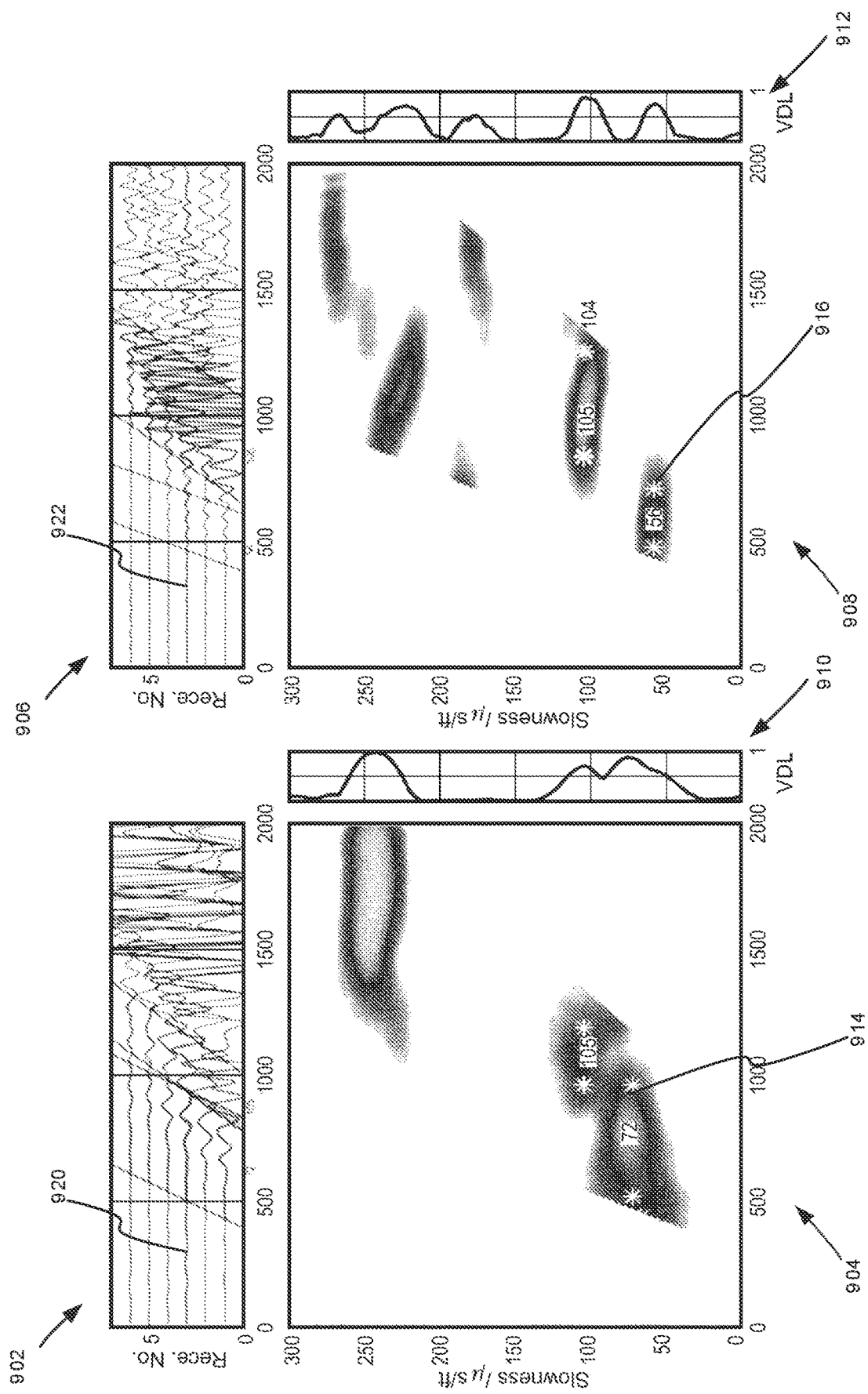
FIG. 9 depicts graphs of waves from an LWD-CBL tool before and after preprocessing operation that use a bandpass time-domain filter to reduce tool waves.

FIG. 9 depicts graphs of waves from an LWD-CBL tool before and after preprocessing operation that use bandpass time-domain filter to reduce tool waves. A first graph 902 depicts sample waves 920 corresponding to the receiver number of an LWD-CBL tool before preprocessing. The sample unprocessed waves 920 are composed of the result of a single acquisition of the LWD-CBL tool. A second graph 904 depicts a semblance map of the unprocessed waves 920 corresponding to the first graph 902. A third graph 906 depicts preprocessed waves 922 corresponding to the receiver number of the LWD-CBL tool after preprocessing the unprocessed waves 920 from the first graph 902. The bandpass time-domain filter is applied to the preprocessed waves 922 as described in FIG. 4 to obtain the processed waves 920. A fourth graph 908 depicts a semblance map of the preprocessed waves 922 corresponding to the third graph 906. Fifth graph 910 and sixth graph 912 depict variable density log (VDL) displays corresponding to first graph 902 and second graph 906 respectively. In the second graph 904, a tool wave 914 with a slowness of 72 μs/ft is dominant in the first break of the waveforms. However, in the fourth graph 908 after preprocessing, a casing waves 916 with a slowness of 56 μs/ft is dominant in the first break of the waveforms.

Figure 10:
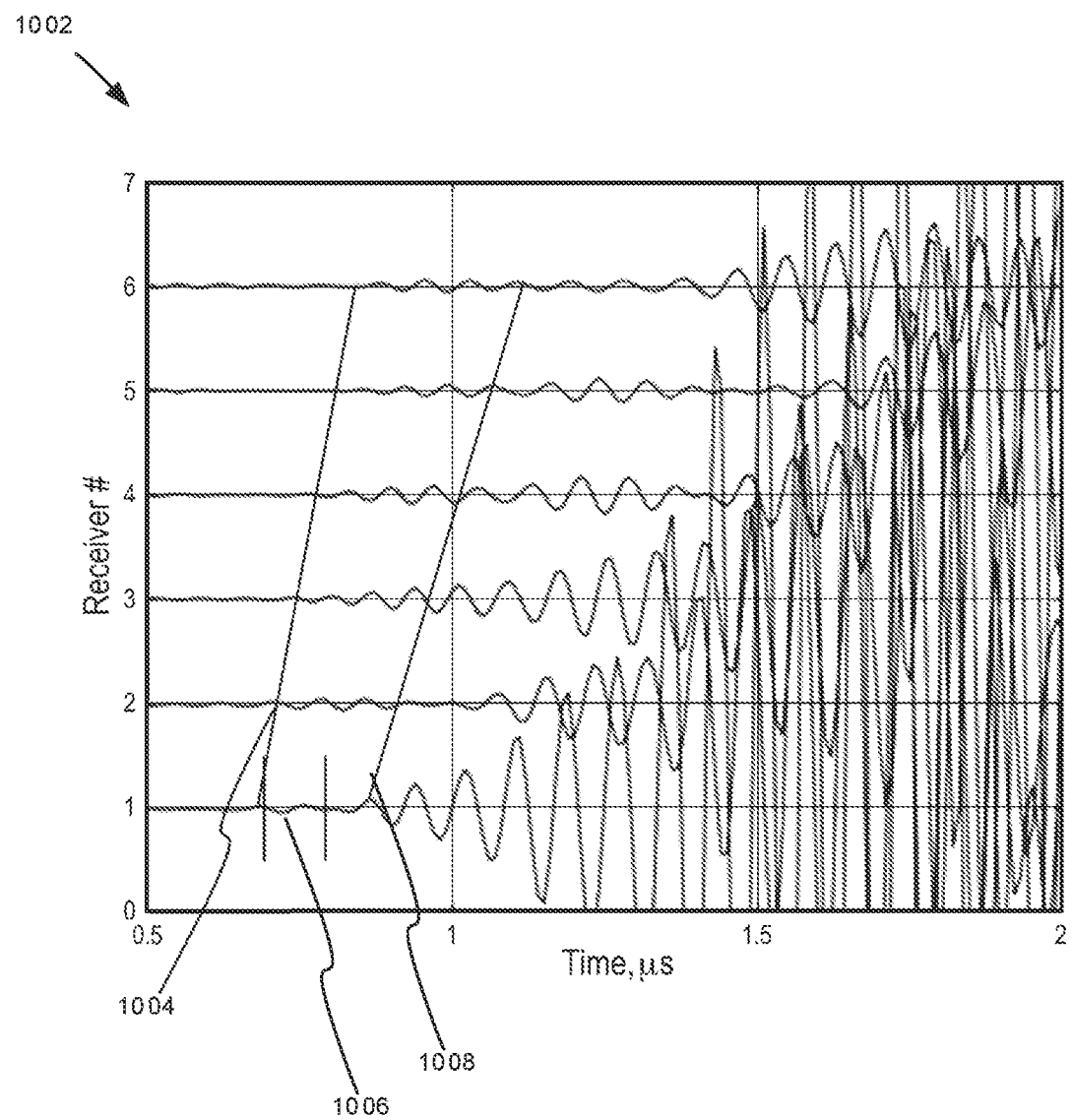
FIG. 10 depicts a graph of another sample array of waves from an LWD-CBL tool for testing the effectiveness of the stacking procedure.
Figure 11:
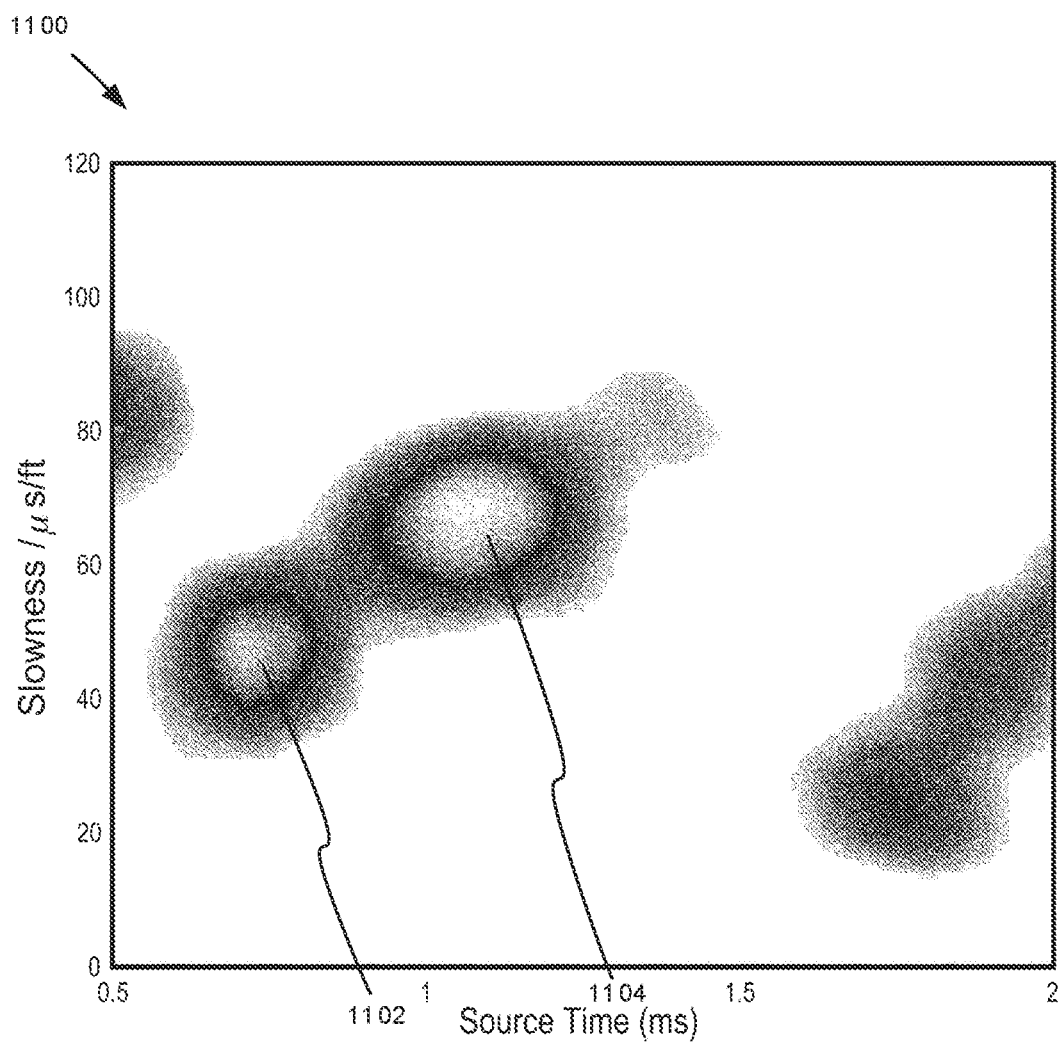
FIG. 11 depicts a semblance map corresponding to FIG. 10 after bandpass filtering.
Figure 12:
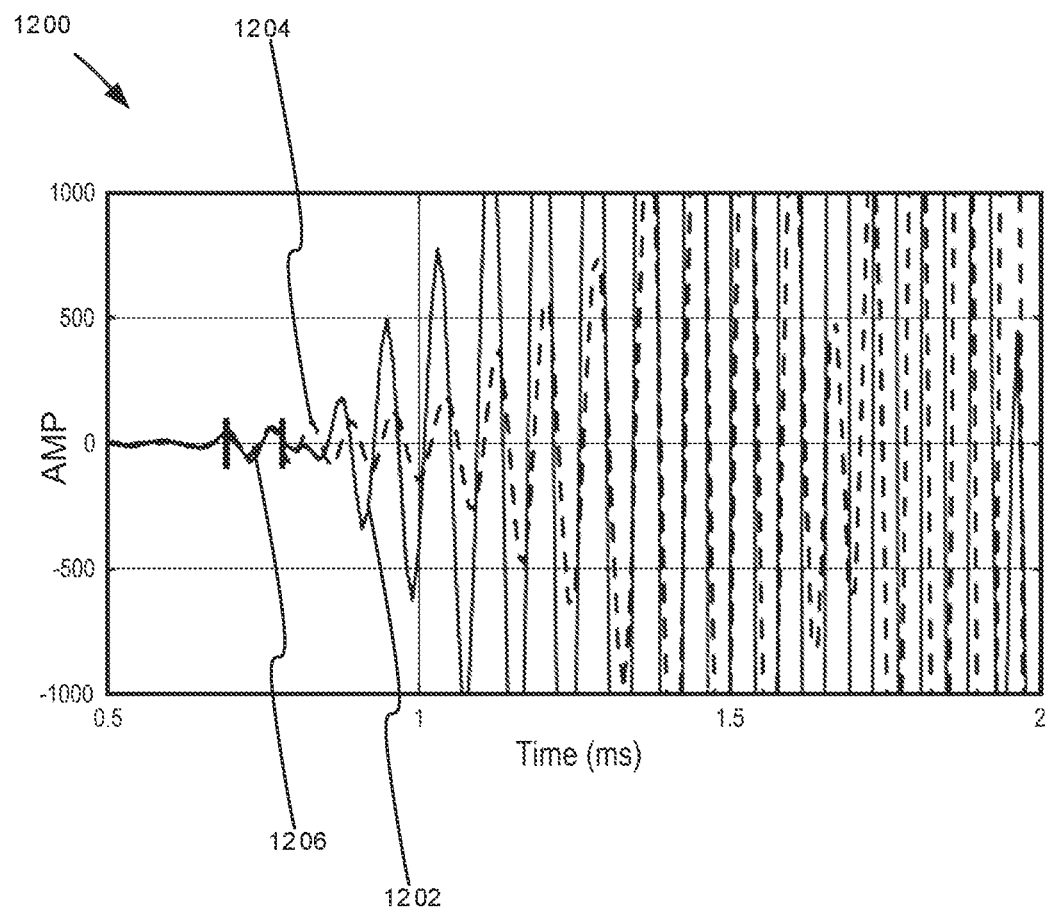
FIG. 12 depicts a graph of the waves that has undergone stacking after the waves are propagated to a reference receiver.

FIG. 10 depicts a graph 1002 of another sample array of waves from an LWD-CBL tool for testing the effectiveness of the stacking procedure. A first diagonal line 1004 traversing waves of multiple receivers represent the time at which the casing waves arrives at their respective receivers. A second diagonal line 1008 represents the time at which the tool waves arrive at their respective receivers. A section 1006 marked off by two vertical lines represents the target stop time window of the tool waves. FIG. 11 depicts a semblance map corresponding to FIG. 10 after bandpass filtering. A graph 1100 shows casing waves 1102 being dominant in the first break of the waveforms ahead of tool waves 1104. FIG. 12 depicts a graph of waves that have undergone stacking after the waves are propagated to a reference receiver. A graph 1200 illustrates the effects of stacking and propagation in mitigating the tool waves. The graph 1200 depicts solid line 1202 representing sample waves from the reference receiver and dashed line 1204 representing the stacked waves that are propagated to the reference receiver. The casing wave section 1206 marked by two vertical lines remains relatively unaffected. Stacking and propagating the waves to the reference receiver has the effect of attenuating all waves that do not propagate at the casing wave slowness. A tool wave section 1208 is significantly attenuated as shown by the difference in the heights of solid line 1202 and dashed line 1204.

Figure 13:
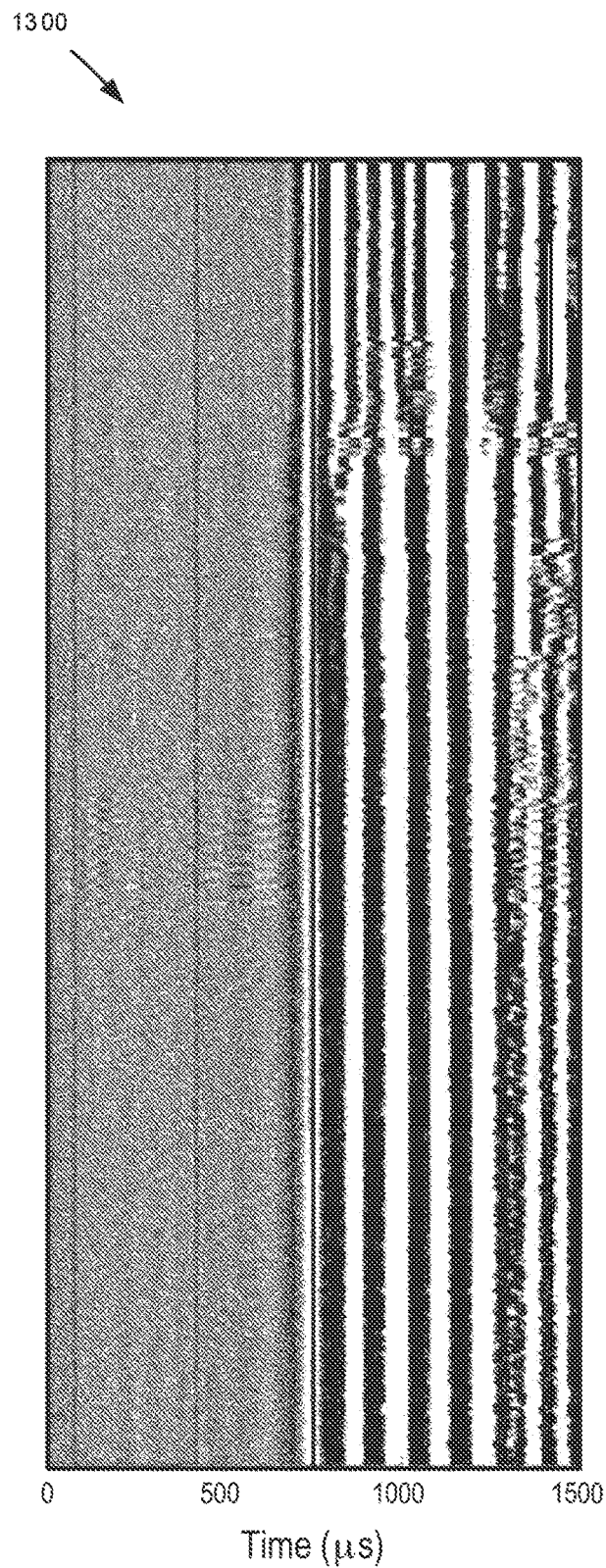
FIG. 13 depicts a variable display log (VDL) display showing example waves at the reference source-receiver separation.
Figure 14:
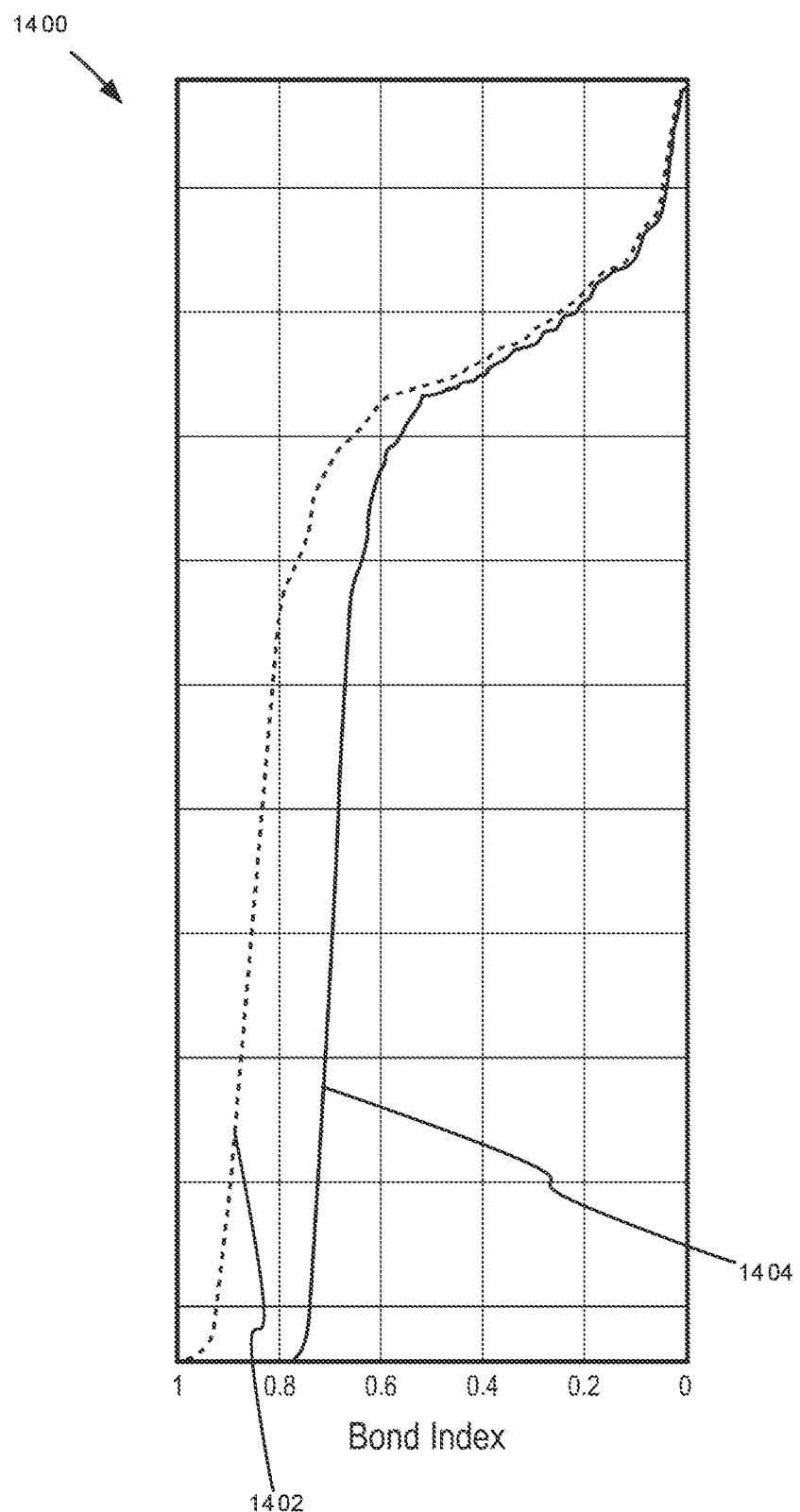
FIG. 14 depicts the estimated BI before and after LWD-CBL wave processing to remove tool waves.
Figure 15:
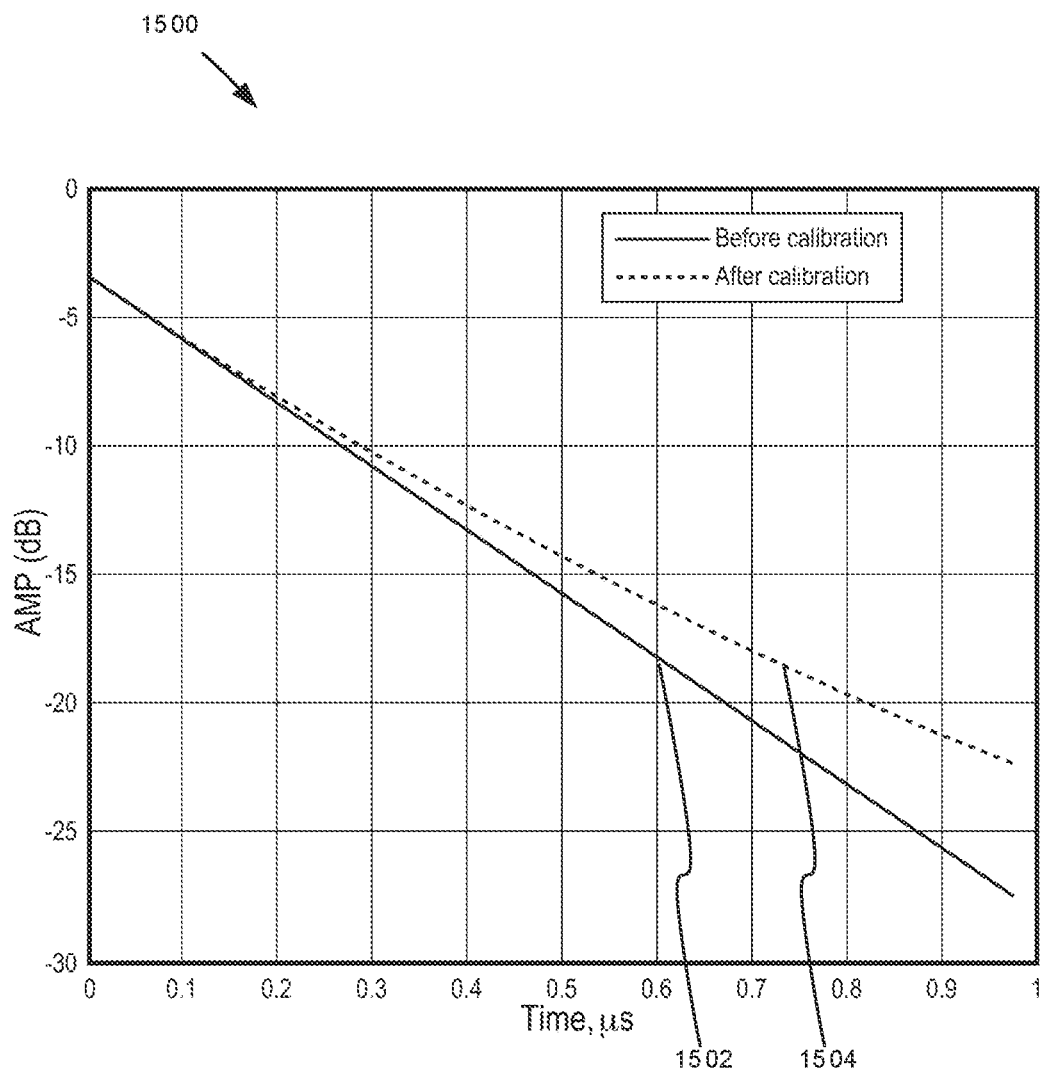
FIG. 15 depicts a graph of the relationship between the first echo amplitudes against BI before and after LWD-CBL wave processing to remove tool wave.

FIG. 13 depicts a variable display log (VDL) display showing example waves at the reference source-receiver separation. A graph 1300 is an example VDL display generated from an LWD-CBL tool. FIG. 14 depicts the estimated BI before and after LWD-CBL wave processing to remove tool waves. A graph 1400 contains a solid line 1404 which represents the BI corresponding to FIG. 13 without preprocessing and the tool wave calibration. A dotted line 1402 represents the BI corresponding to FIG. 13 after LWD-CBL wave processing to remove tool waves. FIG. 15 depicts a graph of the relationship between the first echo amplitudes against BI before and after LWD-CBL wave processing to remove tool waves. A graph 1500 contains a first line 1504 that represents the relationship between the first echo amplitudes against BI before LWD-CBL wave processing and a second line 1506 that represents the relationship between the first echo amplitudes against BI after LWD-CBL wave processing.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platforms (operating system and/or hardware), application ecosystems, interfaces, programmer preferences, programming language, administrator preferences, etc.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   receiving, at a first set of receivers, an array of waves detected from an interaction between acoustic waves generated by an acoustic tool and a casing of a wellbore;
   applying filtering to the array of waves received at the first set of receivers to generate an array of pre-processed waveforms based on the received array of waveforms;
   propagating the pre-processed waveforms to a reference receiver with a casing wave slowness;
   stacking the pre-processed waveforms received at the reference receiver to sum the waveforms together to produce a set of stacked waveforms; and
   generating a bonding index based, at least in part, on the set of stacked waveforms.

2. The method of claim 1, further comprising:
   calculating an arrival time of a first echo based on the set of stacked waveforms;
   calculating a first amplitude and a first phase of the first echo;
   modifying the first amplitude of the first echo to remove a tool wave amplitude;
   determining a first casing wave amplitude for a free casing zone and a second casing wave amplitude for a well-bonded casing zone; and
   generating the bonding index based, at least in part, on the modified first echo amplitude, the first casing wave amplitude, and the second casing wave amplitude.

3. The method of claim 1, wherein the filtering of the array of waves comprises:
   generating a bandpass time-domain filter based on a tool wave stopband; and
   applying the bandpass time-domain filter to the array of waves.

4. The method of claim 1, wherein the filtering of the array of waves comprises:
   performing 2D FAST Fourier Transform (FFT) to convert wave data to a frequency-wave number (F-K) domain;
   performing F-K filtering to exclude tool wave data; and
   performing 2D inverse FFT to convert the wave data to a time-space domain.

5. The method of claim 1 further comprising:
   identifying, based on the set of stacked waveforms, a free casing zone with little to no cement bonding and a well-bonded casing zone with complete or near complete cement bonding;
   determining a tool wave based, at least in part, on a second echo and a predicted casing wave of the well-bonded zone, wherein the second echo is an earliest echo response generated at a section of the casing corresponding to the well-bonded casing zone; and
   determining a tool wave amplitude based on the tool wave.

6. The method of claim 5, further comprising:
   predicting an amplitude of a casing wave corresponding to the well-bonded casing zone using forward modeling and the first casing wave amplitude for a free casing zone,
   wherein determining the tool wave amplitude comprises determining a difference between an amplitude of the second echo and the predicted amplitude of the casing wave.

7. The method of claim 6, wherein modifying the first amplitude of the first echo to remove the tool wave amplitude comprises:
   calculating a phase difference between the predicted casing wave of the well-bonded zone and the tool wave; and
   performing an amplitude correction on the first echo based, at least in part, on the phase difference, an amplitude of the predicted casing wave of the well-bonded zone, and the tool wave amplitude.

8. The method of claim 1, wherein propagating the pre-processed waveforms to the reference receiver with a casing wave slowness comprises the pre-processed waveforms by applying a wave propagation equation: %

$$Wav_i^j(t)=Wav_i|t+s(z_i-z_j)|,$$

wherein $Wav_i$ is the wave spectrum at a current receiver of the first set of receivers, $z_i$ and $z_j$ denote an offset of the reference receiver and the current receiver, and s is the reference slowness for propagating the waves to the current receiver.

9. The method of claim 8, wherein the reference slowness is selected to be equal to a casing wave slowness in order to increase a signal-to-noise ratio of random noise.

10. A system comprising:
a logging-while-drilling (LWD) acoustic tool; comprising a first set of receivers and a reference receiver;
a processor; and
a machine-readable medium having instructions stored thereon that are executable by the processor to cause the system to,
receive, at a first set of receivers, an array of waves detected from an interaction between acoustic waves generated by an acoustic tool and a casing of a wellbore;
apply filtering to the array of waves received at the first set of receivers to generate an array of pre-processed waveforms based on the received array of waveforms;
propagate the pre-processed waveforms to a reference receiver with a casing wave slowness;
stack the pre-processed waveforms received at the reference receiver to sum the waveforms together; and
generate a bonding index based, at least in part, on the stacked waveforms.

11. The system of claim 10, wherein the machine-readable medium further comprises instructions executable by the processor to cause the system to,
calculate an arrival time of a first echo based on the array of pre-processed waveforms;
calculate a first amplitude and a first phase of the first echo;
modify the first amplitude of the first echo by subtracting at least a tool wave amplitude from first amplitude of first echo to remove a tool wave effect;
determine a first casing wave amplitude for a free casing zone and a second casing wave amplitude for a well-bonded casing zone; and
generate the bonding index based, at least in part, on the modified first echo amplitude, the first casing wave amplitude, and the second casing wave amplitude.

12. The system of claim 10, wherein the instructions executable by the processor to apply filtering to the array of waves further include instructions to,
generate a bandpass time-domain filter based on a tool wave stopband; and
apply the bandpass time-domain filter to the array of waves.

13. The system of claim 10, wherein the instructions executable by the processor to apply filtering to the array of waves further include instructions to,
perform 2D FAST Fourier Transform (FFT) to convert wave data to a frequency-wave number (F-K) domain;
perform F-K filtering to exclude tool wave data; and
perform 2D inverse FFT to convert the wave data to a time-space domain.

14. The system of claim 10, wherein the machine-readable medium further comprises instructions executable by the processor to cause the system to,
identify, based on the array of pre-processed waveforms, the free casing zone with little to no cement bonding and a well-bonded casing zone with complete or near complete cement bonding;
determine a tool wave based, at least in part, on a second echo and a predicted casing wave of a well-bonded zone, wherein the second echo is an earliest echo response generated at a section of the casing corresponding to the well-bonded casing zone; and
determine the tool wave amplitude based on the tool wave.

15. The system of claim 14, wherein the machine-readable medium further comprises instructions executable by the processor to cause the system to,
predict the amplitude of a casing wave corresponding to the well-bonded casing zone using forward modeling and the casing wave,
wherein the instructions to determine the tool wave amplitude comprises instructions to determine a difference between the predicted amplitude of the casing wave and an amplitude of the second echo.

16. The system of claim 10, wherein the machine-readable medium further comprises instructions executable by the processor to cause the system to calculate bonding index uncertainties based, at least in part, on the modified first echo amplitude and an estimated noise preceding the first echo.

17. The system of claim 10, wherein at least the first set of receivers are centered within the logging-while-drilling acoustic tool.

18. A non-transitory, computer-readable medium having instructions stored thereon that are executable by a computing device to perform operations comprising:
receive, at a first set of receivers, an array of waves detected from an interaction between acoustic waves generated by an acoustic tool and a casing of a wellbore;
apply filtering to the array of waves received at the first set of receivers to generate an array of pre-processed waveforms based on the received array of waveforms;
propagate the pre-processed waveforms to a reference receiver with a casing wave slowness;
stack the pre-processed waveforms received at the reference receiver to sum the waveforms together; and
generate a bonding index based, at least in part, on the stacked waveforms.

19. The non-transitory, computer-readable medium of claim 18, wherein instructions stored thereon that are executable by a computing device to apply filtering to the array of waves further comprise instructions to:
generate a bandpass time-domain filter based on a tool wave stopband; and
applying the bandpass time-domain filter to wave data.

20. The non-transitory, computer-readable medium of claim 18, wherein instructions stored thereon that are executable by a computing device to apply filtering to the array of waves further comprise instructions to:
perform 2D FAST Fourier Transform (FFT) to convert wave data to a frequency-wave number (F-K) domain;
perform F-K filtering to exclude tool wave data; and
perform 2D inverse FFT to convert the wave data to a time-space domain.

* * * * *